US 6,728,375 B1

(12) United States Patent
Palett et al.

(10) Patent No.: US 6,728,375 B1
(45) Date of Patent: *Apr. 27, 2004

(54) MIRROR MOUNTED MOBILE TELEPHONE SYSTEM

(76) Inventors: Anthony P. Palett, 31458 Hunters Cir., Farmington Hills, MI (US) 48334; Gil Spear, 915 Sea Grape La., Vero Beach, FL (US) 32963

( * ) Notice: Subject to any disclaimer, the term of this patent is extended or adjusted under 35 U.S.C. 154(b) by 143 days.

This patent is subject to a terminal disclaimer.

(21) Appl. No.: 09/801,370

(22) Filed: Mar. 7, 2001

Related U.S. Application Data

(63) Continuation of application No. 09/481,219, filed on Jan. 11, 2000, now Pat. No. 6,246,765, which is a continuation of application No. 09/075,685, filed on May 11, 1998, now Pat. No. 6,026,162, which is a continuation of application No. 08/335,008, filed on Nov. 7, 1994, now Pat. No. 5,940,503, which is a continuation of application No. 08/012,382, filed on Feb. 2, 1993, now abandoned.

(51) Int. Cl.⁷ .................................................. H04M 1/00
(52) U.S. Cl. ...................... 379/454; 379/446; 379/455
(58) Field of Search .................................. 379/454, 446, 379/447, 455, 428.02; 455/90, 575; 248/475.1

(56) References Cited

U.S. PATENT DOCUMENTS

| 4,362,907 A | 12/1982 | Polacsek |
| 4,588,267 A | 5/1986 | Pastore |
| 4,625,210 A | 11/1986 | Sagl |
| 4,630,904 A | 12/1986 | Pastore |
| 4,760,394 A | 7/1988 | Takeuchi et al. |
| 4,870,676 A | 9/1989 | Lewo |
| 4,875,229 A | 10/1989 | Palett et al. |
| 4,905,270 A | 2/1990 | Ono |
| 4,943,796 A | 7/1990 | Lee |
| D315,890 S | 4/1991 | Lewo |
| D316,242 S | 4/1991 | Lewo |
| D326,450 S | 5/1992 | Watanabe |
| D337,582 S | 7/1993 | Lewo |
| 5,455,716 A | 10/1995 | Suman et al. |
| 5,649,317 A | 7/1997 | Suzuki |

OTHER PUBLICATIONS

Brochure for Cadillac Allante, Jun. 1989.*
1990 Cadillac Allanté Owner's Manual, ©1989.

* cited by examiner

*Primary Examiner*—Jack Chiang
(74) *Attorney, Agent, or Firm*—Price, Heneveld, Cooper, DeWitt & Litton

(57) ABSTRACT

An improved portable telephone and an improved inside rearview mirror assembly coacts with the portable telephone to provide an improved mobile telephone system. The portable telephone includes a housing of generally rectangular configuration defining a recess in one face of the housing, a microphone mounted in the housing, an arm pivotally mounted at one end thereof on the housing for movement between a stowed position in which it is positioned in the housing recess and an extended position in which the other end of the arm is positioned in spaced relation to the housing, and a speaker mounted on the other end of the arm. The rearview mirror assembly includes a bracket assembly mounted on top of the rearview mirror and including a holster defining a socket for receipt of the portable telephone. External contacts on the telephone coact with contacts in the socket to establish electrical communication between the telephone and the transceiver of the vehicle when the telephone is inserted into the holster. Alternatively, the mobile telephone may be built permanently into the rearview mirror assembly.

71 Claims, 12 Drawing Sheets

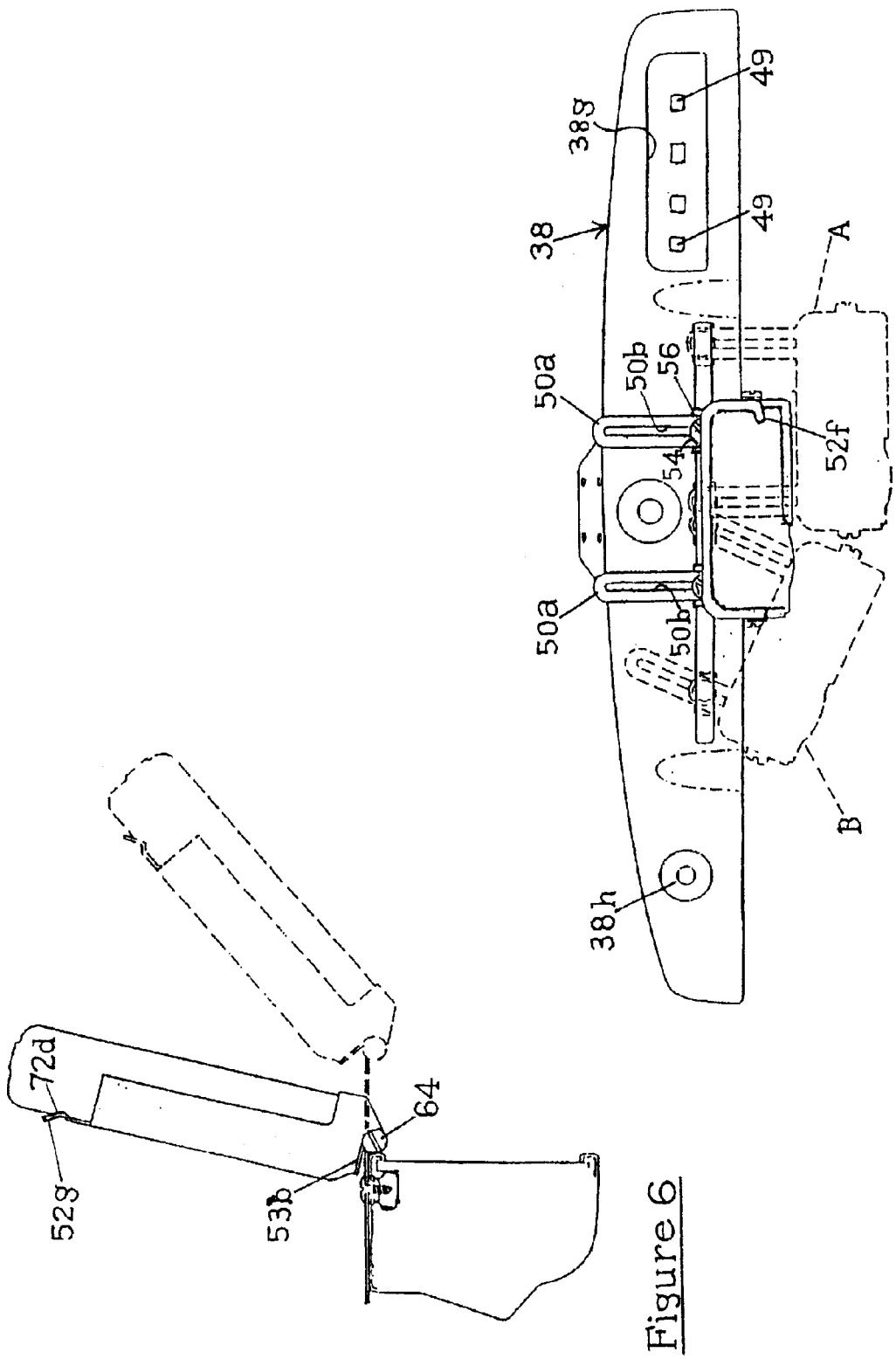

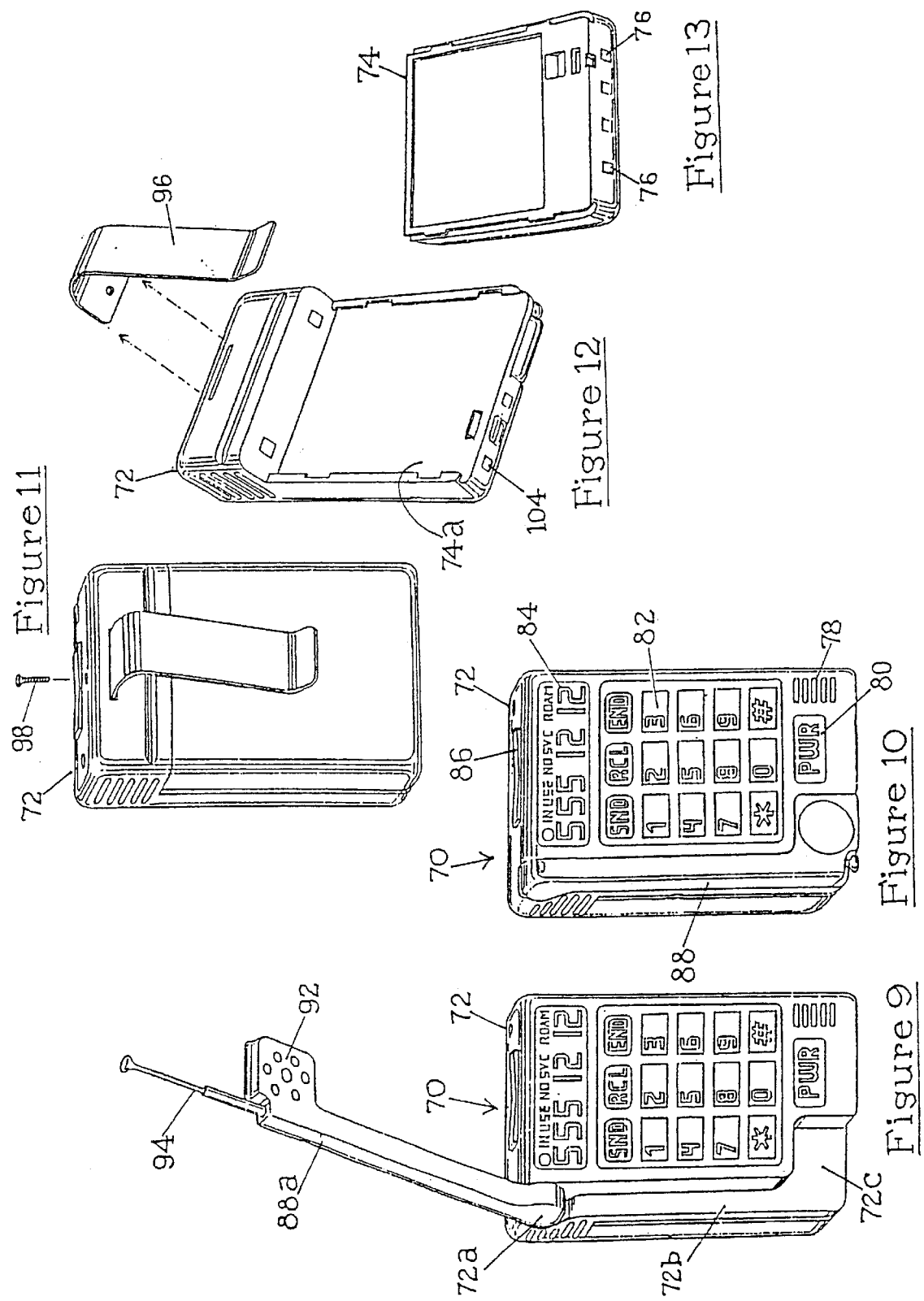

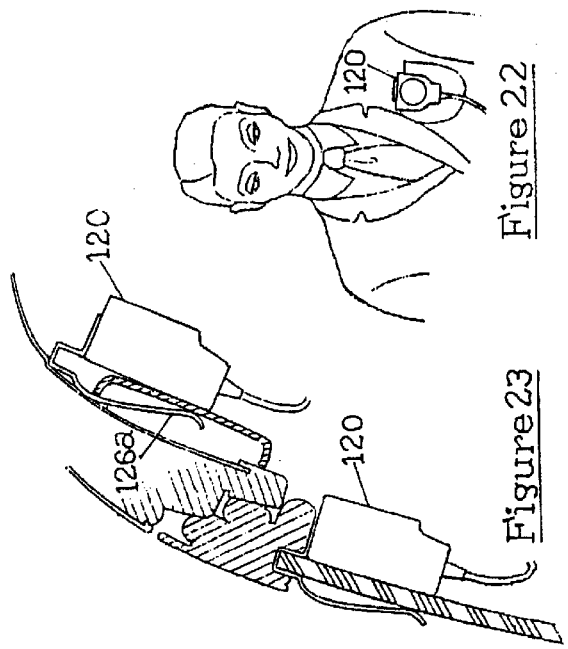
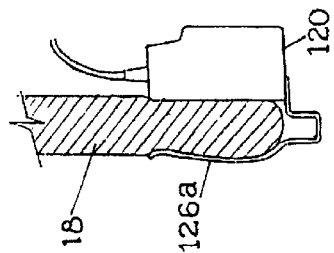
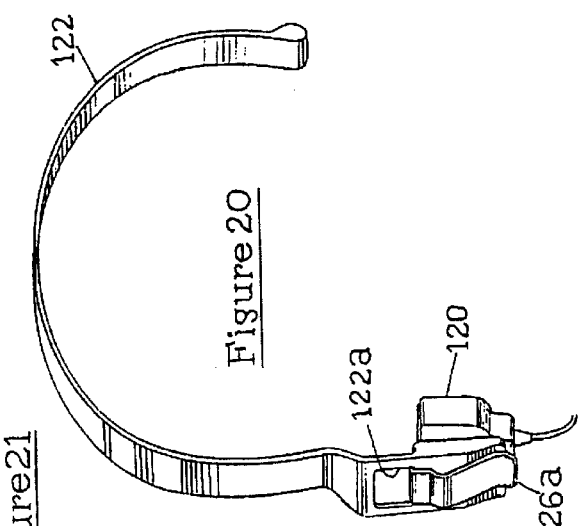
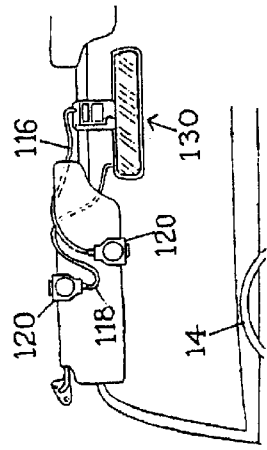
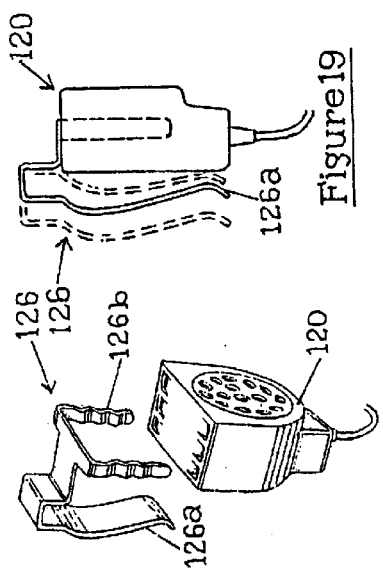
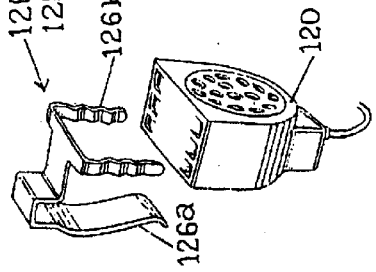
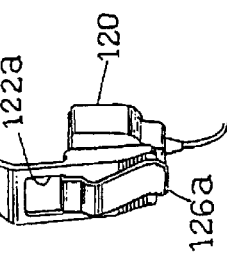

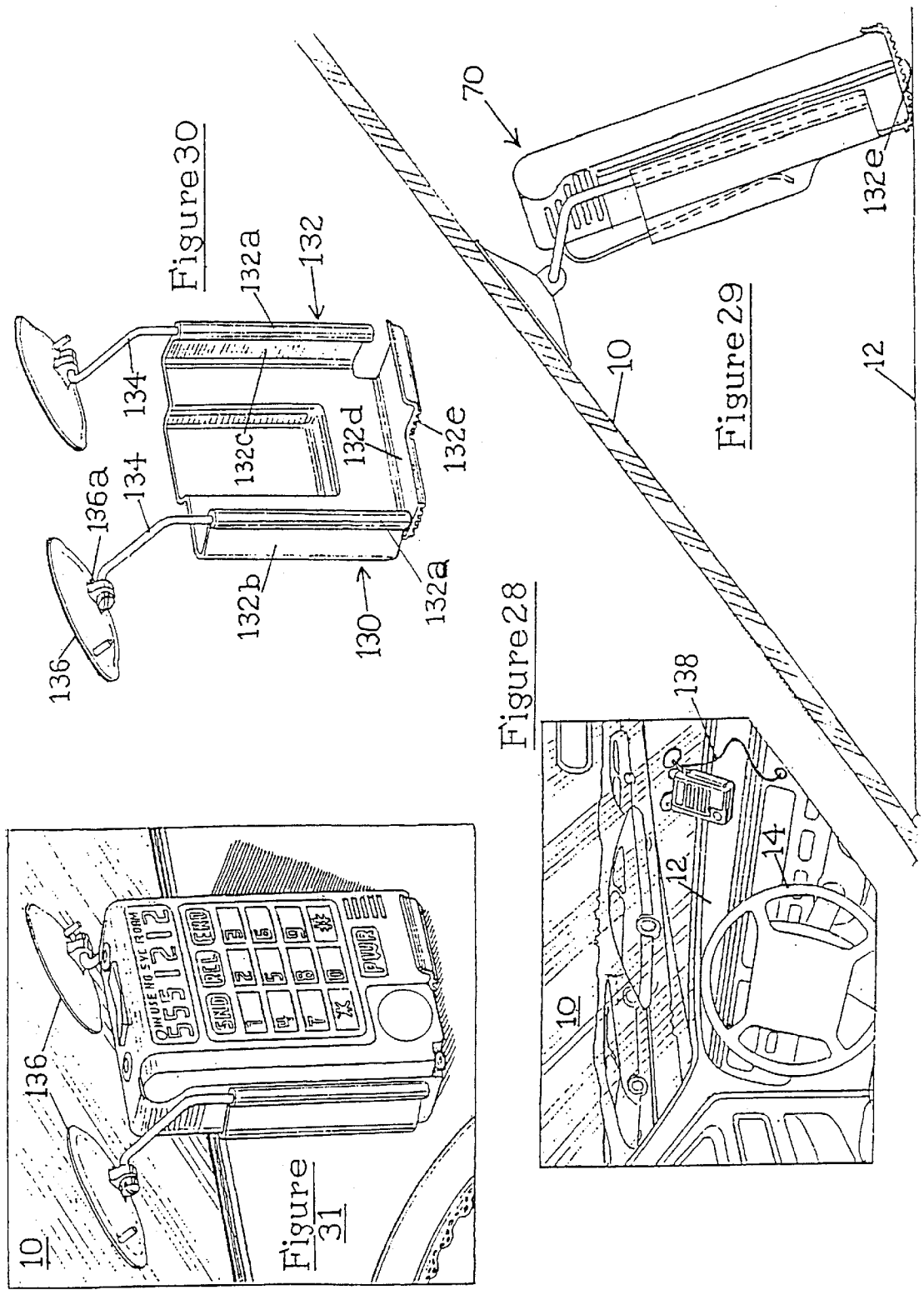

MIRROR MOUNTED MOBILE TELEPHONE SYSTEM

CROSS-REFERENCE TO RELATED APPLICATIONS

This application is a continuation of U.S. patent application Ser. No. 09/481,219, entitled "MIRROR MOUNTED MOBILE TELEPHONE SYSTEM," filed on Jan. 11, 2000, by Palett et al., now U.S. Pat. No. 6,246,765, which is a continuation of U.S. patent application Ser. No. 09/075,685, entitled "MIRROR MOUNTED MOBILE TELEPHONE SYSTEM," filed on May 11, 1998, by Palett et al., now U.S. Pat. No. 6,026,162, which is a continuation of U.S. patent application Ser. No. 08/335,008, entitled "MIRROR MOUNTED MOBILE TELEPHONE SYSTEM," filed on Nov. 7, 1994, by Palett et al., now U.S. Pat. No. 5,940,503, which is a continuation of U.S. patent application Ser. No. 08/012,382, entitled "MIRROR MOUNTED MOBILE TELEPHONE SYSTEM," filed on Feb. 2, 1993, by Palett et al., now abandoned. The entire disclosures of each of these applications is incorporated herein by reference.

BACKGROUND OF THE INVENTION

The invention relates to telephones and more particularly to mobile cellular telephones for motor vehicular use.

Current mobile telephones are patterned after home and office equipment and are difficult to locate in motor vehicles. The crowded condition, which exists in vehicle interiors, results in a need for concepts in mobile telephones which can save space in the vehicle interiors. Moreover, the current telephone locations cause safety concerns. For example, the current locations on instrument panels and consoles require the driver to divert his attention from the road when utilizing the telephone and the telephones may impact, or be impacted by, the driver or passenger in a collision situation. The current locations are further deficient in that they fail to accommodate a wide range of vehicle designs and sizes. In some cases, the equipment designs have required substantial vehicle modifications to accommodate the equipment within the vehicle and these modifications have increased new model investment costs as well as manufacturing costs.

One improved method of locating a mobile telephone in a motor vehicle is shown in U.S. Pat. No. 4,707,273 wherein the telephone is mounted in the sunvisor of the vehicle. Whereas this location is an improvement over the instrument panel and console locations in the sense that the driver need not substantially divert his extremely close proximity of the telephone controls to the eyes of the driver can create focusing problems, especially when the driver is using vision correction devices such as eyeglasses or contact lenses.

SUMMARY OF THE INVENTION

This invention is directed to the provision of an improved mobile telephone system. More particularly, this invention is directed to the provision of a mobile telephone system which allows the driver to maintain a good view of the road while operating the telephone and which is located at a distance from the driver's eyes to allow easy focusing on the controls of the telephone.

This invention is further directed to the provision of an improved mobile telephone system which is inexpensive and which does not require any modification of the motor vehicle interior to accommodate the telephone system.

This invention is further directed to the provision of an improved portable telephone.

The invention relates to both a method and an apparatus for providing improved mobile telephone service.

The improved methodology relates to an improved method of providing mobile telephone service for a motor vehicle of the type including a windshield and a power source positioned in the motor vehicle. According to the invention methodology, an electrical connection to the power source is provided proximate the upper central region of the windshield and a telephone is electrically connected to the electrical connection. This methodology positions the telephone in an area that is readily visible by the driver, does not obstruct the driver's vision, and allows easy focusing on the telephone controls.

According to a further feature of the invention methodology, the motor vehicle further includes an inside rearview mirror positioned proximate the upper central region of the windshield, and the step of providing an electrical connection on the rearview mirror to the power source comprises providing an electrical connection to the power source. This methodology utilizes the existing rearview mirror to form the foundation for mounting the telephone.

According to a further feature of the invention methodology, the telephone is portable and includes external electrical connectors and the step of providing an electrical connection on the rearview mirror to the power source comprises providing connector means on the top of the rearview mirror for electrical connection to the telephone connectors. This methodology conveniently positions the portable telephone on top of the rearview mirror in electrical connection with the vehicular power source.

According to a further feature of the invention methodology, the step of providing an electrical connection to the power source further includes providing a socket on the rearview mirror including the electrical connectors, and the step of removably electrically connecting a portable telephone to the electrical connectors comprises positioning the portable telephone in the socket with the electrical connectors of the telephone connected to the electrical connectors of the socket.

According to a further feature of the invention methodology, the step of providing a socket on the rearview mirror comprises providing a holster sized to receive the portable telephone and positioning the holster on the rearview mirror.

According to a further feature of the invention methodology, the portable telephone further includes a battery and the method includes the further step of providing means on the rearview mirror to recharge the battery.

According to a further feature of the invention methodology, the step of providing means on the rearview mirror to recharge the battery includes providing a pocket in the rearview mirror sized to receive the battery and providing an electrical connection in the pocket to the vehicular power source so as to electrically connect the vehicular power source to a battery inserted in the pocket.

According to a further feature of the invention methodology, the method includes the further steps of providing a separate speaker/microphone, providing an elongated flexible extension member, providing an input jack on the rearview mirror, positioning the speaker/microphone on one end of the elongated flexible extension member, and plugging the other end of the elongated flexible extension member into the input jack.

The invention further provides a mirror assembly for use with a motor vehicle of the type including a windshield and a power source positioned within the vehicle. The invention mirror assembly includes an inside rearview mirror adapted to be secured within the vehicle in a position proximate the upper central region of the windshield, a telephone on the mirror, and means establishing electrical connection between the telephone and the power source with the telephone mounted on the mirror.

In one embodiment of the invention mirror assembly, the telephone is removably mounted on the mirror by mounting means including a holster secured to the top of the mirror and defining a socket for receipt of the mobile telephone.

In further embodiments of the invention mirror assembly, at least one of the components of the telephone is built into the casing of the mirror.

According to a further feature of the invention mirror assembly, the mirror assembly further includes means for recharging the battery of the portable telephone. In the disclosed embodiment of the invention, the recharging means includes a pocket opening in the top of the mirror and sized to receive the battery.

According to a further feature of the invention mirror assembly, the mirror assembly further includes a separate speaker/microphone and means for physically and electrically connecting the speaker/microphone to the mirror with the speaker/microphone positioned remote from the mirror and proximate the driver of the vehicle. In the disclosed embodiment of the invention, the connecting means includes a flexible cable connected at one end to the mirror and mounting the speaker/microphone at its other, free end.

The invention also provides an improved portable or personal telephone. The improved portable telephone of the invention comprises an outgoing message microphone member, an incoming message speaker member, and means operative to vary the spacing between the members. This arrangement allows the microphone and speaker members to be positioned relatively close to each other for compactness to improve the portability and stowability of the telephone, and allows the microphone and speaker to be selectively spaced further apart to facilitate association of the microphone member with the mouth of the user and association of the speaker member with the ear of the user. In the disclosed embodiment of the invention, the telephone includes a housing, the microphone member is mounted in the housing, and the telephone further includes means operative to move the speaker member to a stored position proximate the housing and an operative position spaced from the housing. The operative means may comprise, for example, an arm pivotally mounted at one end on the housing and mounting the speaker member at its other end.

These and other features, advantages, and objects of the present invention will be further understood and appreciated by those skilled in the art by reference to the following specification, claims, and appended drawings.

BRIEF DESCRIPTION OF THE DRAWINGS

In the drawings:

FIGS. 6 and 7 are end and top views, respectively, of the invention mirror assembly;

FIGS. 9–13 are detailed views of a personal telephone according to the invention;

FIGS. 17–23 illustrate a microphone that may be utilized in association with the invention telephone and further illustrating various ways in which the microphone may be mounted within the vehicle;

FIGS. 28–31 illustrate an alternate arrangement for mounting the invention personal telephone in the vehicle.

DETAILED DESCRIPTION OF THE PREFERRED EMBODIMENTS

Figure 1:
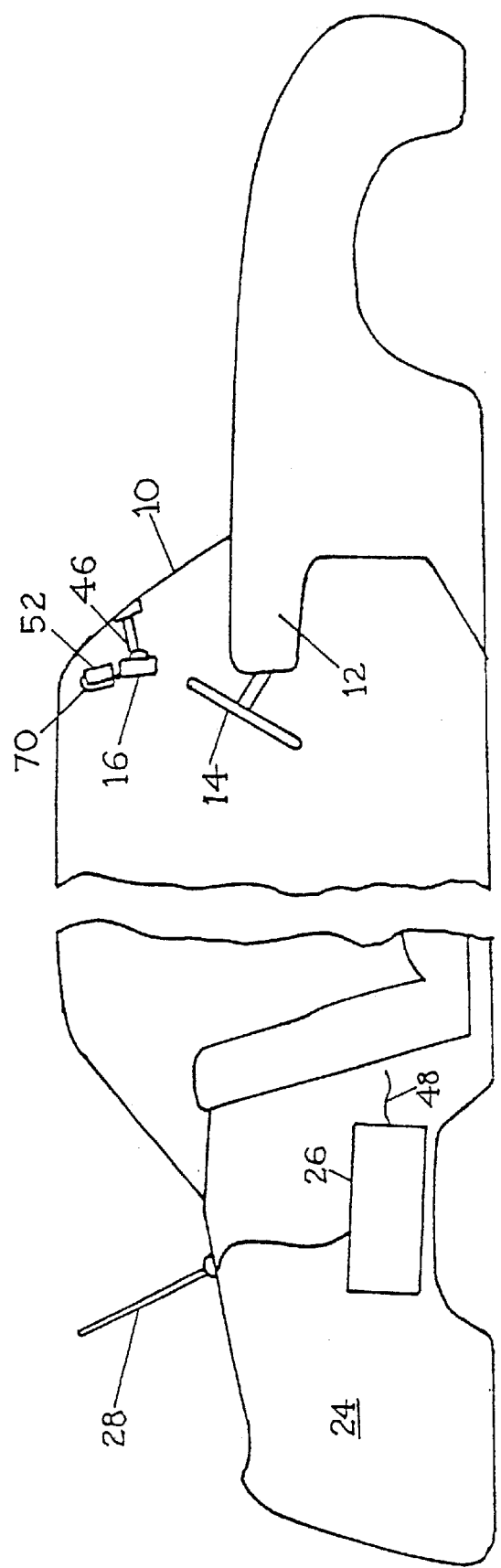
FIG. 1 is a fragmentary schematic view of a motor vehicle employing the invention mobile telephone system.

The invention mobile telephone system is intended for use in a motor vehicle of the type including a windshield 10, an instrument panel 12, a steering wheel 14, a pair of sunvisors 18, a headliner 20, A pillars 22, and a trunk 24.

A suitable power supply, such as, for example, a transceiver 26, is positioned in the trunk 24 and coacts with an external antenna 28 to process outgoing and incoming telephone calls in a known manner.

The invention provides an inside rearview mirror assembly 30 to facilitate the provision of a mobile telephone system in the vehicle. Mirror assembly 30 includes an inside rearview mirror 32, a bracket assembly 34, and a speaker/microphone assembly 36.

Mirror 32 includes a hollow casing 38 and a mirror glass 42. Casing 38 includes a top wall 38a, a front wall 38b, a bottom wall 38c, end walls 38d, and a rim 38e. Rim 38e coacts with the main body of the casing to position mirror glass 42 at the rear face of the mirror.

An elongated slot 38f is provided in top wall 38a of casing 38, a battery charging pocket 38g opens in top wall 38a on one side of slot 38f, and an input jack 38h opens in top wall 38a on the other side of slot 38f. Rear wall 38b includes a raised mounting portion 38i to facilitate securement of the mirror to the upper central region of the windshield 10 as, for example, by a bracket 46 adhesively secured at one end to the windshield and pivotally secured at its other end to the mirror. Alternatively, and in a known manner, the mirror may be secured to the windshield header.

A power cord 48 is connected at one end to transceiver 26 and passes at its other end through an opening 38j in the front wall 38b of the mirror casing. After passing through the opening 38j, the power cord 48 splits electrically to form a series of parallel bundled leads 48a which emerge from the casing through slot 38f. A series of contacts 49 are provided at the bottom of pocket 38g and these contacts are suitably connected via power cord 48 to a source of power such as the vehicle battery. It will be understood that jack 38h is also suitably powered through cord 48.

Bracket assembly 34 includes a bracket 50, a holster 52, and an angle plate 53. Bracket 50 includes a pair of arm portions 50a each defining a slot 50b, a cross bar portion 50c joining the arm portions 50a, and journals 50d. Bracket 50 is mounted for adjustable movement on casing 38 by a pair of screws 54 passing through slots 50a for threaded engagement with nuts 56 slidably positioned in slot 38f so that, by selective loosening and tightening of screws 54, the bracket may be adjustably positioned along the length of the slot, may be adjustably positioned transversely of the slot (as seen in dashed outline A in FIG. 7), and may be positioned in a canted relation with respect to the slot (as seen in dashed outline B in FIG. 7) by positioning one screw 54 relatively forwardly in one slot 50a and the other screw 54 relatively rearwardly in the other slot 50a.

Holster 52 has a generally U configuration in cross section and includes a front wall 52a, side walls 52b and 52c, a bottom wall 52d, and a front wall 52e coacting to define a socket 60. Rear wall 52e is in the form of a lip or a rim extending only partially across the width of the holster and having a vertical height that is only a minor fraction of the vertical height of the walls 52a, 52b, and 52c. A plurality of contacts 62 is provided at the bottom of socket 60. Holster 52 includes lugs 52f coacting with screws 64 and journals 50d to mount the holster for pivotal movement on bracket 50. Coil springs 66 are connected at their respective ends to the holster and to the bracket and act in a known manner to resist pivotal movement of the holster 52 relative to the bracket. The holster normally assumes the generally upright position seen in FIG. 6, but may be selectively pivoted rearwardly against the bias of spring 66 to facilitate insertion of a portable telephone 70 into the holster. Bundled leads 48a extend through an opening 52g in the front wall 52a of the holster for respective electrical connection to contacts 62.

Angle plate 53 includes journal portions 53a and an angle plate portion 53b. Angle plate 53 is positioned with its journals 53a positioned immediately inboard of respective bracket journals 50d. Nylon inserts or bushings 71 are received in journals 53a and threaded inboard ends 64a of screws 64 are threaded into bushings 71. Screws 64 further include a shoulder 64b so that tightening of the screws has the effect of clamping bracket journals 50d inwardly against angle plate journals 53a so as to maintain angle plate portion 53b in any angular position to which it is adjusted. As best seen in FIG. 6, the position of angular adjustment of angle plate portion 53b determines the precise angular position in which holster 52 is maintained by springs 66.

Speaker/microphone assembly 36 includes an elongated flexible cable 67, a plug 68 on one end of cable 67 to allow the cable to be plugged into input jack 38, and a speaker/microphone 69 mounted on the other, free end of cable 67. The invention mobile telephone system may be used with or without the speaker/microphone assembly 36.

The invention portable telephone 70 includes a housing 72 of generally rectangular configuration, a battery 74 adapted to be removably positioned in a cutout 72a in the housing and including a plurality of contacts 76 to facilitate recharging of the battery, an outgoing message microphone 78 mounted in the housing, a power switch 80 mounted in the housing, a plurality of outgoing call pushbuttons 82 mounted in the housing and coacting with circuit board means (not shown) within the housing to generate outgoing telephone signals corresponding to the selected pushbutton sequence, a digital display 84 to display outgoing calls and other telephone functions, a volume control 86 mounted at the top of the housing, an arm 88 pivotally mounted at 90° to the housing for movement between a compact stowed position (as seen in FIG. 10) in which the arm is positioned in a recess 72b in the housing and an extended operative position (as seen in FIG. 9) in which the arm is pivoted upwardly to position the free end 88a of the arm in spaced relation to the housing, an incoming message speaker 92 mounted on the free end 88a of arm 88 and positioned in a housing recess 72c with arm 88 in its stowed position, and an antenna 94 telescopically mounted in arm 88. Optionally, a pocket clip 96 may be secured to the housing by a screw 98. Alternatively, clip 96 may be adjustably secured to the housing by a spring (not shown) positioned within the housing.

Figure 14:
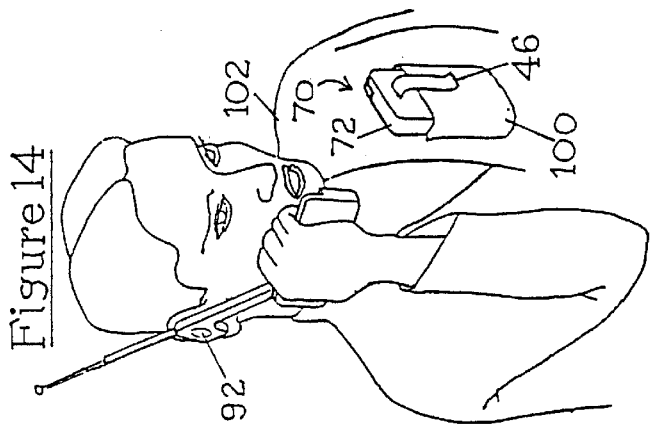
FIG. 14 is a view showing the use of the invention personal telephone.

In the use of the invention telephone 70 as a portable or personal telephone, and as best seen in FIG. 14, the telephone may ordinarily be conveniently stowed (as, for example, in the pocket 100 of a shirt 102 worn by a user) with the arm 88 in its lowered or stowed position. The telephone may be readily prepared for use as a personal or portable telephone by moving the arm 88 to its extended position so as to space the speaker 92 from the microphone 78 by a distance corresponding to the distance between the mouth and ear of a user so that the speaker 92 is positioned proximate the user's ear when the microphone 78 is positioned proximate the user's mouth. Antenna 94 may be selectively moved telescopically relative to arm 88 to fine tune the radio reception.

In the use of the invention personal telephone as part of the invention mobile telephone system, antenna 94 is moved to its stowed position within arm 88, arm 88 is moved to its stowed position relative to the housing, clip 96 (if present) is removed, and the telephone is inserted into holster 52 to position external contacts 104 on the bottom of the housing 72 of the telephone as well as the contacts 76 on the bottom of battery 74 in respective electrical communication with contacts 62 at the bottom of the socket 60 defined by the holster 52. Alternatively, the telephone may be mounted in the holster with the arm 88 in its raised position and/or clip 96 may remain on the housing and overlap the back of the holster. A light 105 mounted on the mirror casing is lit when the telephone has been positioned in the holster and electrical connection has been established with the transceiver 26. Screws 54 may be selectively loosened and tightened to adjust holster 52 on mirror 32 (longitudinally along slot 38f, transversely of slot 38f, or obliquely with respect to slot 38f) to a position that is comfortable and convenient for use by the driver or a front seat passenger, and holster 52 may be pivoted rearwardly against the resistance of spring 66 to facilitate insertion of telephone 70 into the holster.

As the telephone slides into the holster, a rib 52f on holster side wall 52c slides into a groove on the telephone housing to positively locate the telephone relative to the holster and, as the telephone reaches its bottom position within the holster, the flexible upper portion 52g of front wall 52a snaps into engagement with a transverse groove 72d in the telephone housing to preclude inadvertent displacement of the telephone from the holster. The telephone is now ready for use as the mobile telephone ingredient of the invention mobile telephone system.

When used as a mobile in-car telephone, the portable telephone 70 is powered via the electrical connection between the telephone contacts 76 and 104 and the holster contacts 62 whereby the telephone is connected to and powered by the transceiver 26 via the power cord 48. In operation, depression of power button 80 actuates the system, depression of outgoing call push buttons 82 selects the outgoing call which is displayed in the digital display window 84, the volume is adjusted by selective actuation of volume control 86, microphone 78 serves as the outgoing message microphone, and speaker 92 serves as the incoming message speaker. It will be understood that, with the telephone positioned in the holster, the battery 74 secured to the telephone housing will receive a constant "trickle" charge from the vehicle power system via battery contacts 76 engaging holster contacts 62.

Figure 2:
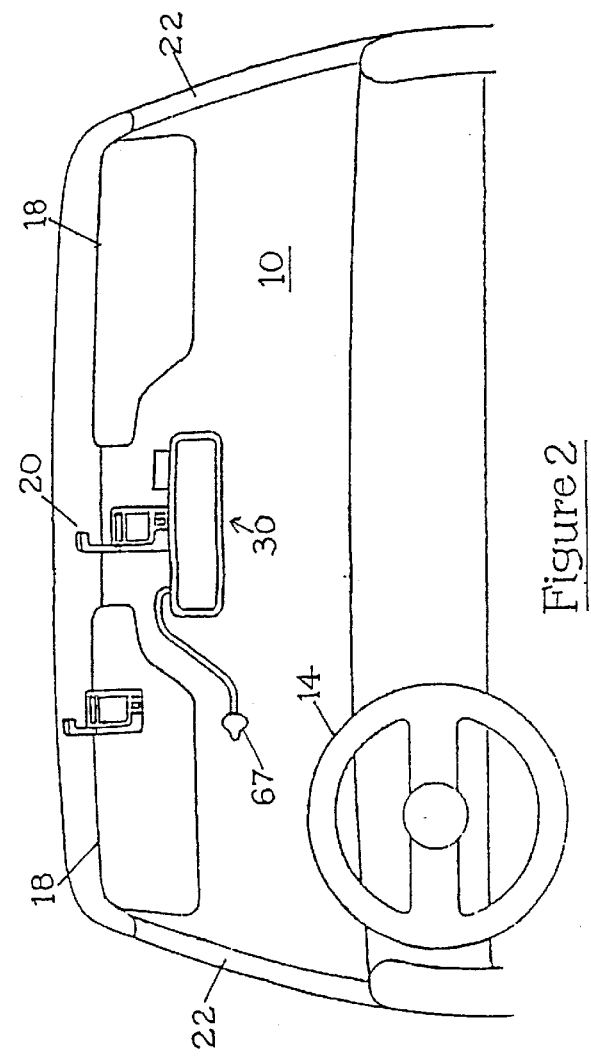
FIG. 2 is a fragmentary view of the motor vehicle of FIG. 1 looking forwardly from the driver's seat.

When speaker/microphone assembly 36 is plugged into jack 38h, the speaker/microphone 69 cooperates with the outgoing message microphone 78 to provide the outgoing message capability of the system and cooperates with incoming message speaker 92 to provide the incoming message capability of the system. The incoming message may thus be delivered with a stereo effect if incorporated with the car audio system or external speaker. Alternatively, the internal circuitry of the system may be arranged such that insertion of the speaker/microphone assembly into the input jack 38 has the effect of cutting out the outgoing message microphone 78 and/or the incoming message speaker 92. As best seen in FIG. 2, the flexible cable 36 enables the speaker/microphone 69 to be selectively positioned proximate the driver's head so as to readily pick up the driver's voice for outgoing message purposes and provide an incoming message signal that is readily discernable by the driver's ear.

Figure 15:
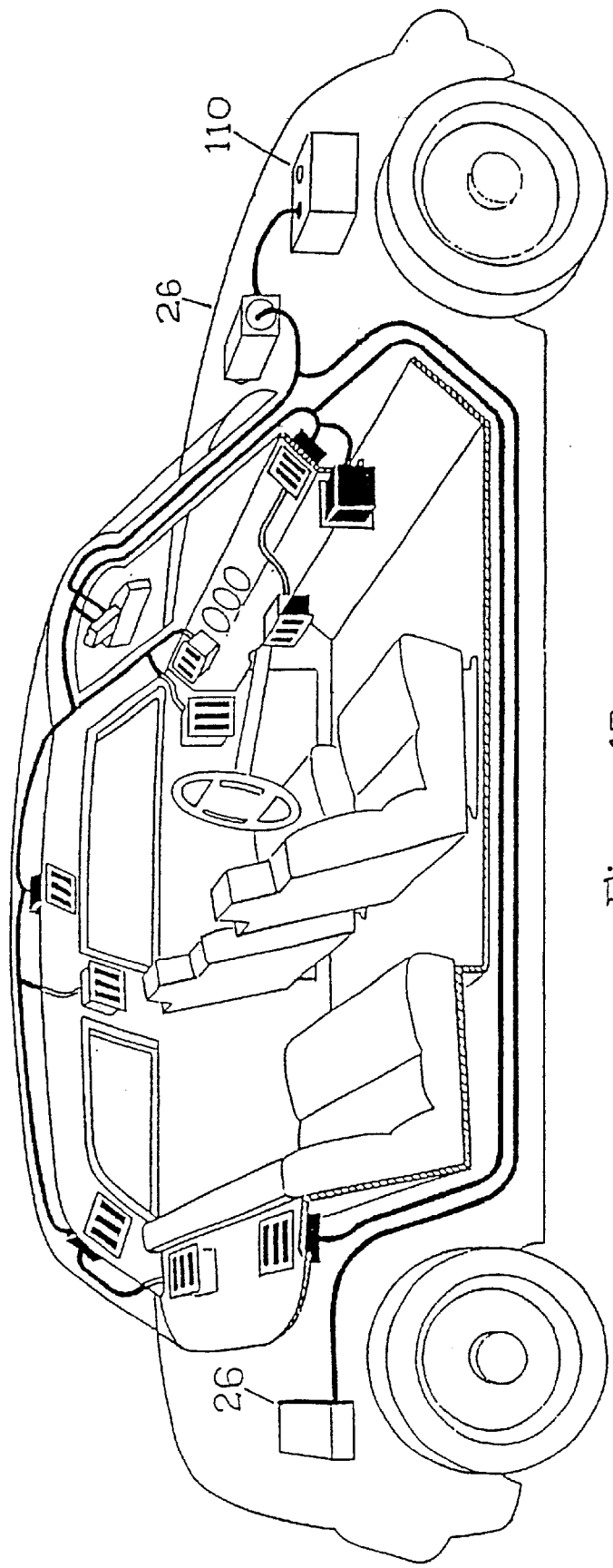
FIG. 15 is a cutaway view of a motor vehicle illustrating various ways in which the audio system of the vehicle may be utilized to receive incoming telephone calls.

As a further alternative arrangement, and as best seen in FIG. 15, the incoming message signal may be transmitted to the driver via the existing motor vehicle audio system. FIG. 15 illustrates various locations where speakers might be placed within the vehicle interior (including instrument panel mounts, door mounts, roof mounts, pillar mounts and rear package shelf mounts) so as to selectively deliver the incoming message to various portions of the vehicle utilizing the existing motor vehicle audio system. FIG. 15 also illustrates that the transceiver, rather than being mounted in the luggage compartment of the vehicle according to the usual practice, may be mounted at other locations in the vehicle such as, for example, under the hood adjacent the vehicle battery 110.

Figure 16:
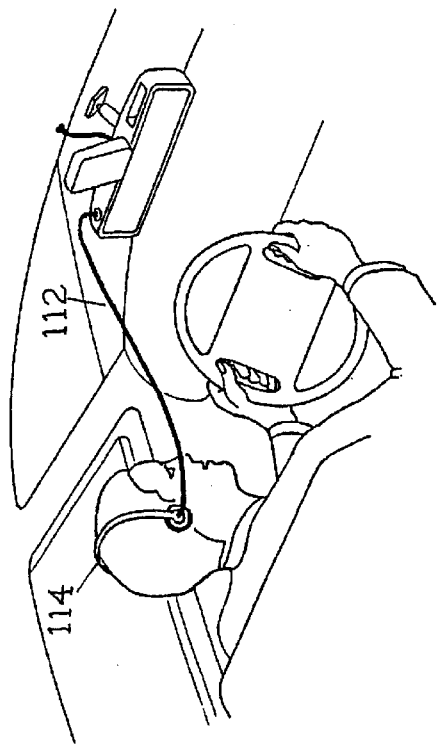
FIG. 16 is a schematic view showing an arrangement for providing privacy for incoming telephone calls.

A further alternative arrangement is seen in FIG. 16 wherein the jack 38h is utilized to receive a cord connected to a headset 114 worn by the driver so as to provide privacy with respect to incoming messages. That is, the system would be wired such that the driver, wearing the headphone set, would hear the incoming messages but the incoming messages would be inaudible to any other occupants of the vehicle.

FIGS. 17–23 illustrate further alternative arrangements whereby a clip-on microphone 120 may be utilized in combination with the mirror mounted telephone to facilitate the receipt of incoming messages or the transmission of outgoing messages. The microphone 120 in each case may be connected to a cord 116 plugged directly into the telephone, or may be connected to a cord 118 connected to jack 38h. The microphone 120 may be clipped over the upper edge of the sunvisor, clipped over the lower edge of the sunvisor, clipped over the upper edge of the door glass of the vehicle door, clipped over or attached to interior trim moldings of the vehicle, or clipped onto the clothing of the driver or other occupant. The microphone may also be utilized in combination with a headband 122 wherein the microphone is clipped into an aperture 122a in one end of the headband for direct contact with the ear of the user. The microphone is preferably a two part construction including the microphone 120, wired to the phone or to the jack on the mirror, and a spring clip 126 including a clip portion 126a for fitting over the appropriate element of the motor vehicle or article of clothing and rippled prong portions 126b arranged to coact with a series of sets of rippled holes in the upper face of the microphone to selectively position the clip relative to the microphone in a wide, medium or close setting relative to the main body portion of the microphone depending upon the element of the motor vehicle or article of clothing to be engaged.

The battery charger feature of the mirror may be utilized to charge a spare battery 74 while the mobile telephone system is in use (with the primary battery secured to the telephone housing receiving a trickle charge via the contacts in the holster) or may be used to recharge the primary battery 74 of the portable telephone when the mobile telephone system is not in use. It will be understood that when the battery 74 is positioned in the pocket 38g, the external battery contacts 76 communicate with a source of power, such as, for example, the vehicle battery, via the contacts 49 and the power cord 48. A light 110 on the mirror casing is lit when a battery is positioned in pocket 38g and is undergoing charging.

The internal circuitry of the portable: telephone is preferably arranged such that the transceiver built into the portable telephone is bypassed when the portable telephone is positioned in the holster 52 for use as a part of the invention mobile telephone system so that the incoming and outgoing signals are routed directly to the transceiver in the trunk of the vehicle where the 0.6 watt outgoing signal of the portable telephone is amplified to a 3 watt signal for transmission over the antenna 28. Alternatively, the telephone circuitry may be arranged such that the outgoing and incoming signals pass through the built-in transceiver in the portable telephone and are suitably amplified for transmission purposes utilizing the external antenna. The system may be operated on either an analog or digital basis and the portable telephone may have voice actuation features whereby the telephone responds in known manner to voice commands from the driver or passenger.

Although the invention has been illustrated and described in connection with a portable telephone which is removably mounted on the mirror, the invention is also applicable to an arrangement in which some or all of the components of the telephone are built into the mirror as a permanent part of the mirror assembly. Several arrangements in which the telephone is built into the mirror are shown respectively in FIGS. 24, 25, and 26.

Figure 24:
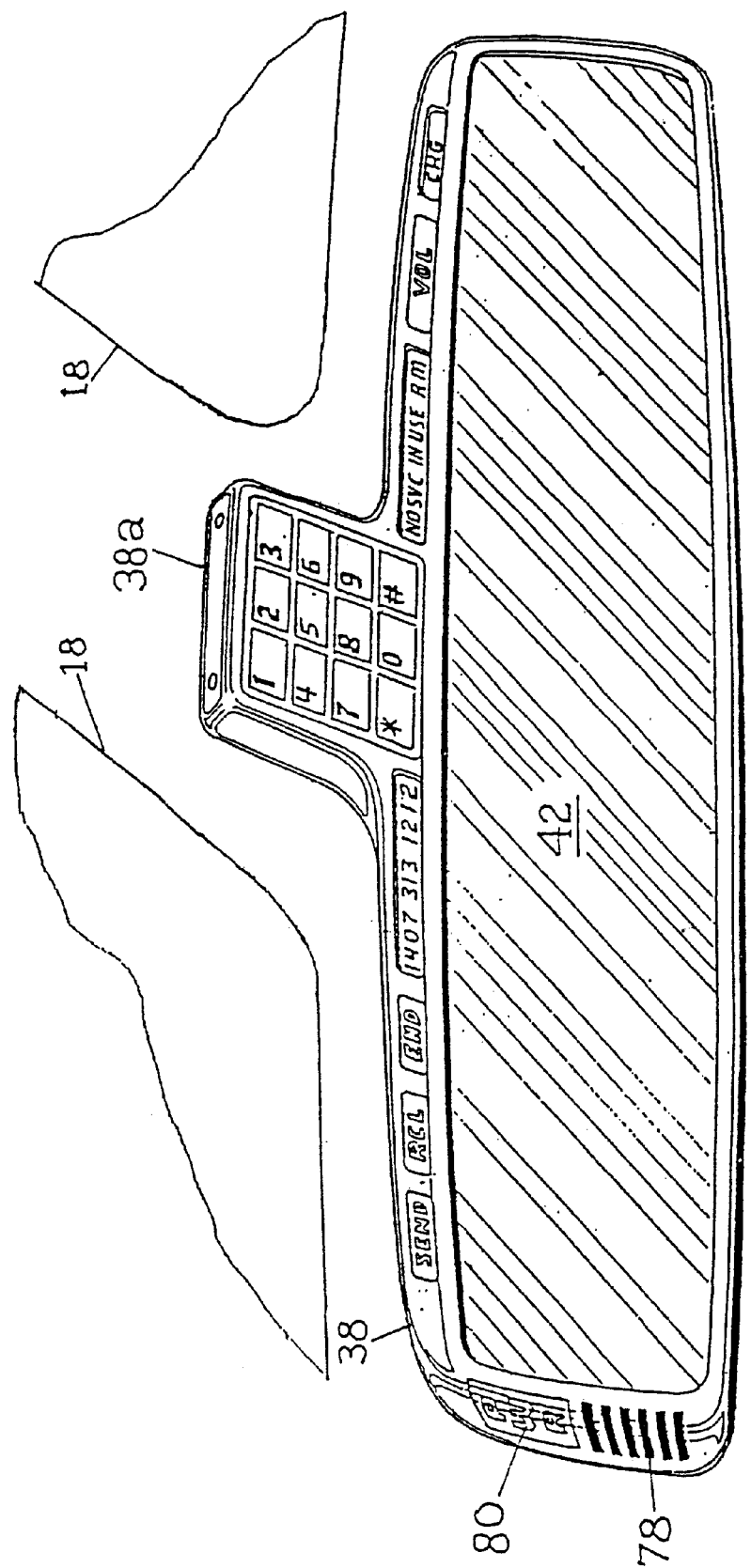

In the arrangement of FIG. 24, the mirror frame 38 includes an outstanding portion 38a housing the keypad of the telephone so that the keypad occupies the normal gap or space between the existing sunvisors 18. The keypad is preferably tilted rearwardly to increase ceiling clearance and to better face the operator. The other controls/components of the telephone are built into the mirror casing along the upper edge of the casing on opposite sides of the upstanding portion 38a and along the left side of the mirror casing where the microphone 78 and power switch 80 are housed.

Figure 25:
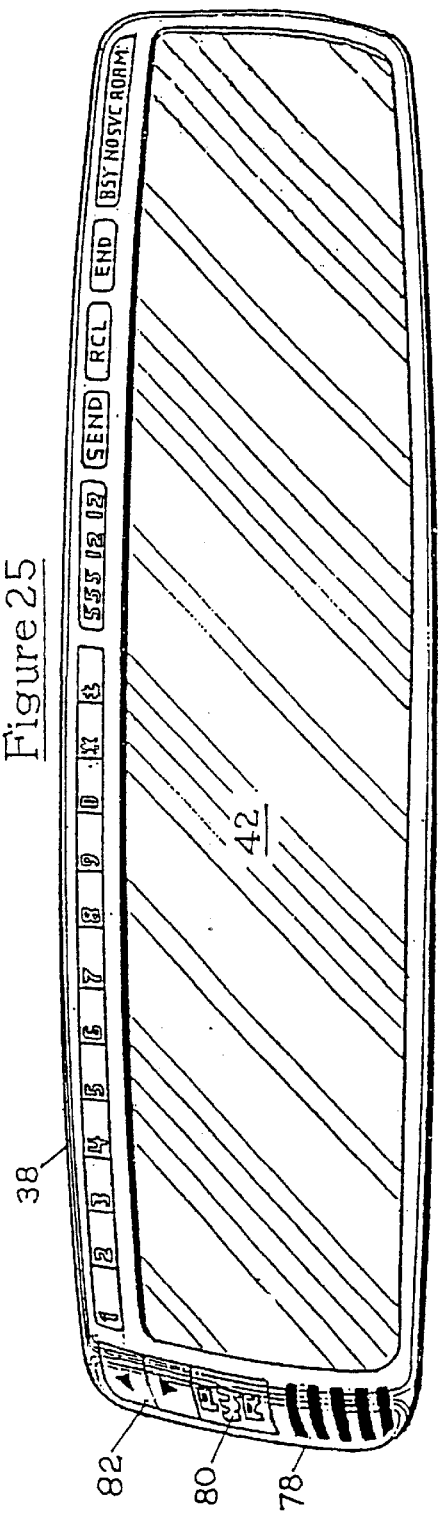
FIGS. 24–27 illustrate embodiments of the invention in which the telephone is built into and forms a permanent part of the rearview mirror assembly.
Figures 3, 8:
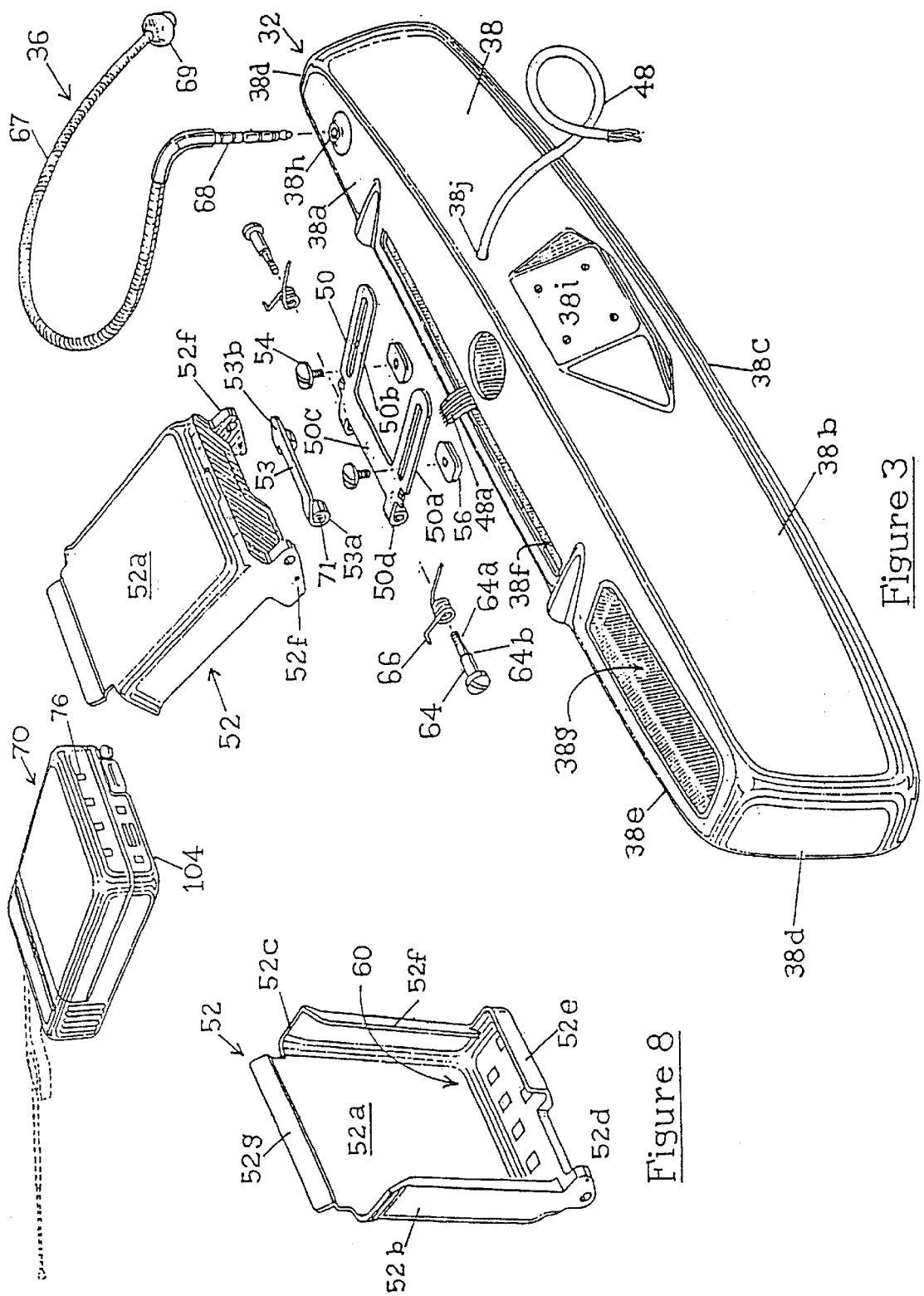
FIG. 3 is an exploded view of a mirror assembly according to the invention.
FIG. 8 is a perspective view of a holster employed in the invention mirror assembly.
Figure 4:
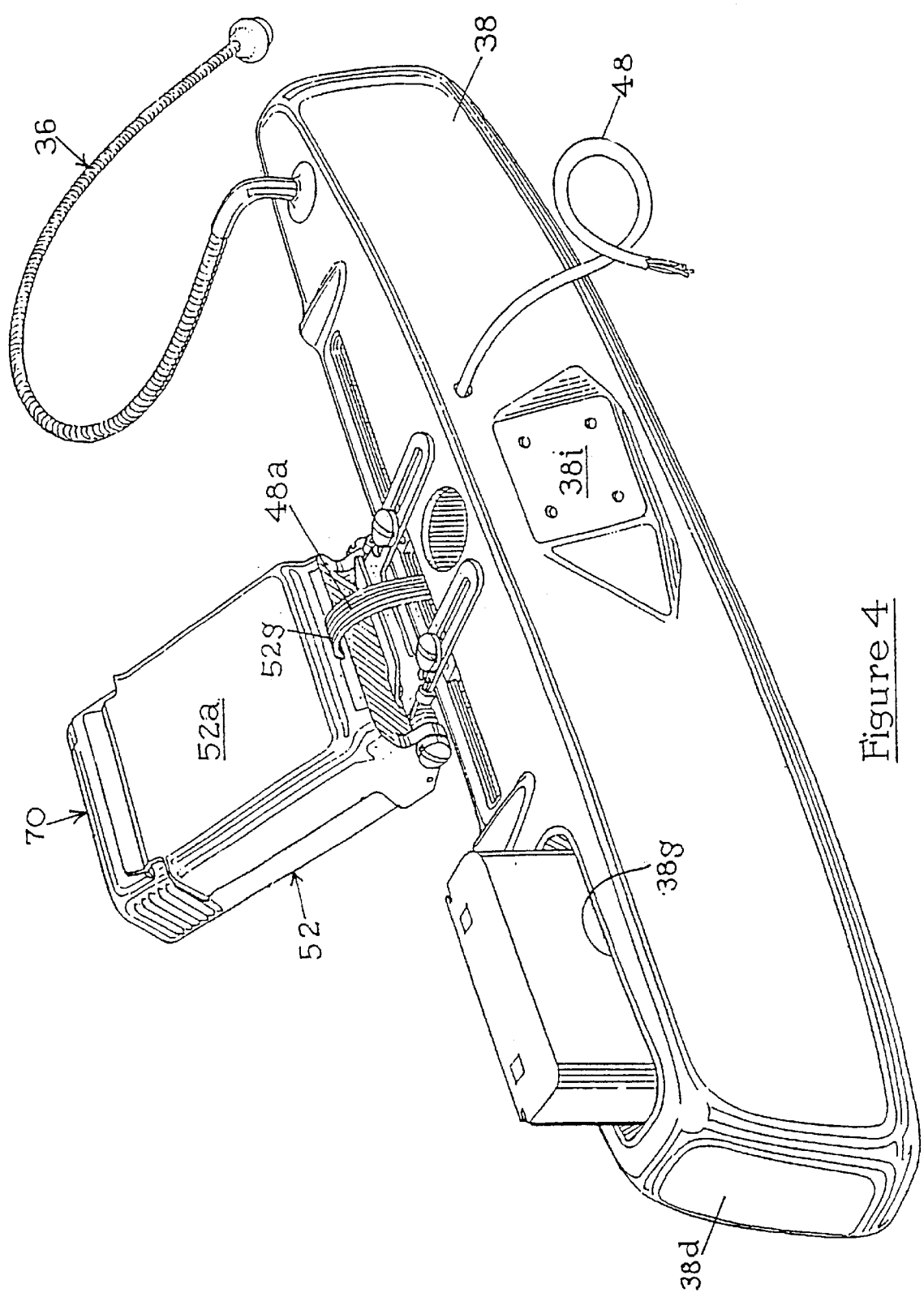
FIG. 4 is an assembled view of the invention mirror assembly looking from the front of the vehicle toward the rear of the vehicle.
Figure 5:
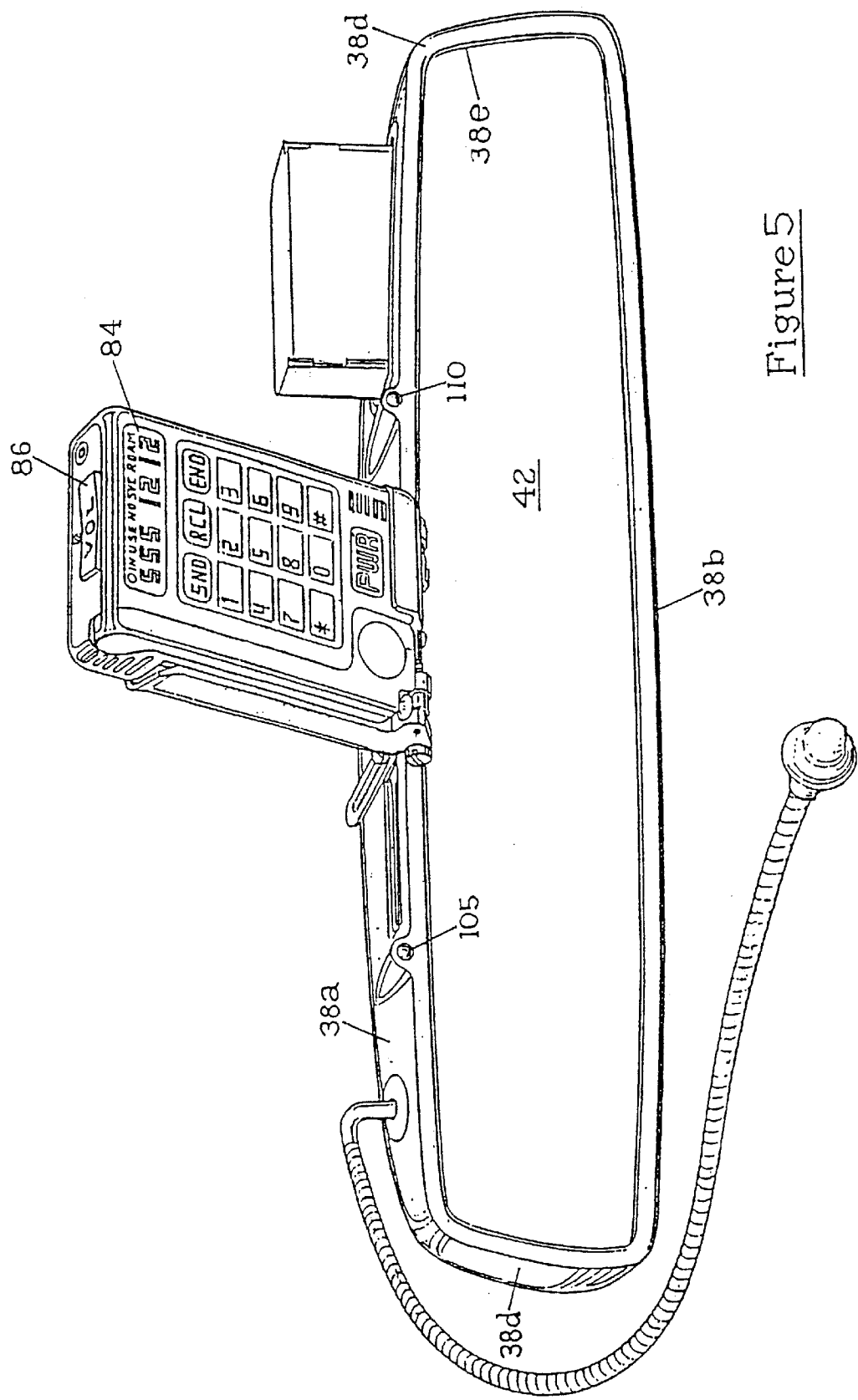
FIG. 5 is an assembled view of the ,invention mirror assembly looking forwardly from the driver's seat.

In the arrangement of FIG. 25, all of the telephone control/components are built directly into the mirror casing with all of the telephone components positioned either in the left portion of the mirror casing (the microphone 78, speaker 80, and volume control 82) or along the upper edge of the mirror casing (the keypad and the other telephone controls). Positioning of the volume and power controls on the left edge of the mirror casing allows these controls to be pushed without disturbing the position of the mirror.

Figure 26:
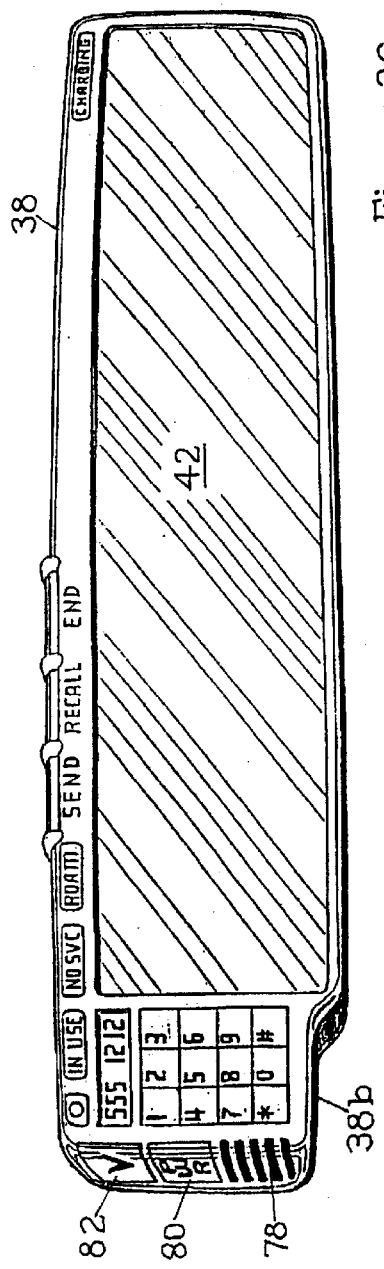
Figure 27:
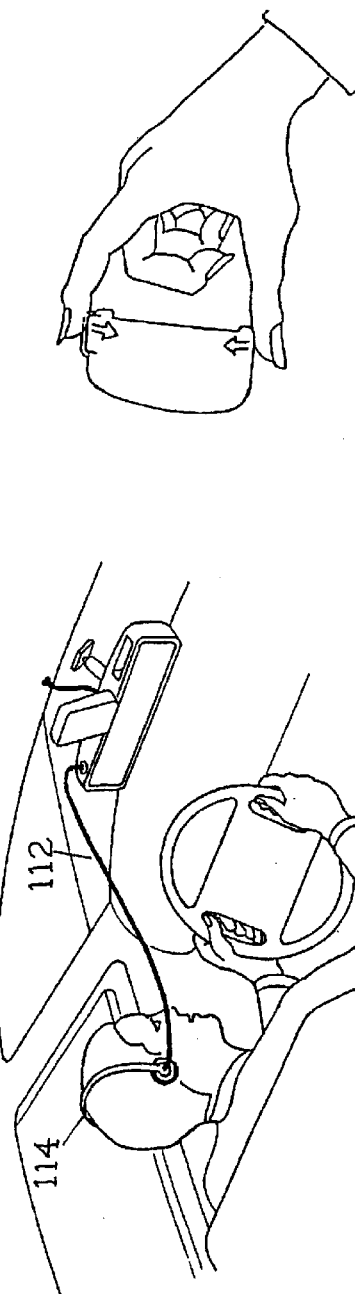

In the arrangement of FIGS. 26 and 27, the casing is enlarged to define a lefthand extension portion 38b housing the keypad as well as the microphone 78, power switch 80, and volume control 82 and the remaining telephone controls are positioned along the upper edge of the mirror casing. Specifically, the "SEND," "RECALL," and "END" controls are positioned along the top of the mirror casing and are preferably arranged to be actuated by a squeezing action, as seen in FIG. 27, rather than a pushing action so as to minimize the possibility of inadvertently moving the mirror and upsetting the preestablished rear vision field provided by the mirror.

As seen in FIGS. 28–31, the invention personal telephone may also be mounted in the vehicle utilizing a holder 130 suitably secured to the inside of the windshield 10. Holder 130 includes a holder body 132, a pair of wire arms 134 slidably and rotatably mounted in tubular bosses 132a formed along the rear vertical edges of the opposite sides of the holder body, and a pair of suction cups 136 arranged to grip the windshield and each including a lug 136a pivotally receiving an upper cranked end 134a of a respective arm 134. Holder body 132 is sized to define a pocket to receive the telephone 70 with the side edges of the telephone positioned within the respective side walls 132b, 132c of the holder body and the lower end of the telephone supported on a bottom or shelf portion 132d of the holder body. Cups 136 are preferably positioned on the windshield in a location such that the lower face of the bottom shelf 132d of the holder body rests on top of the instrument panel 12 of the vehicle with rubberized treads 132e on the lower face of the bottom shelf securely gripping the upper face of the instrument panel. As best seen in FIG. 28, the holder 132 is preferably positioned proximate the central lower region of the windshield so as to position the telephone proximate the central lower region of the windshield immediately above the upper surface of the instrument panel. A cable 138 is plugged at one end into telephone jack 72 and is plugged at its other end into a suitable jack in the instrument panel connected to the vehicle electrical power system.

The invention telephone system will be seen to provide many important advantages. Specifically, the invention system positions the mobile telephone at a location that is readily accessible to the driver, that allows the driver to keep his vision focused primarily on the road while using the telephone, that allows "hands free" operation whereby the driver may keep both hands on the steering wheel when utilizing the telephone, and that allows the driver to achieve sharp focusing with respect to the indicia displayed on the face of the telephone. The mirror mounted location also minimizes the possibility that the telephone system will cause or exacerbate injury in a collision scenario. Further, the invention mobile telephone system does not require any modification of the vehicle to accommodate the system but rather the vehicle manufacturer may, depending on the build order of the particular vehicle, either supply the vehicle with a standard rearview mirror assembly or with the invention rearview mirror assembly. The plug-in speaker/microphone assembly further enhances the system by increasing the message receiving and transmitting capability of the system and yet does not pose any safety risk since it will be readily moved out of the way in a collision scenario. The invention further provides an improved personal or portable telephone which is extremely compact, to facilitate stowage of the telephone in small spaces such as shirt pockets, suitcases, briefcases, purses, et cetera, and yet which may be readily expanded to provide proper and comfortable spacing between the outgoing message microphone and the incoming message speaker.

The invention telephone system further readily provides original equipment installation or after-market installation, may be voice actuated, may be digital or analog, and may include a radio mute feature whereby the radio is automatically muted in response to incoming or outgoing calls. The invention telephone system also allows the telephone to be provided with two batteries, with one battery at all times secured to the telephone housing, and receiving a trickle charge when the telephone is positioned in the mirror holster, and the other battery positioned in the pocket 38g for charging from the vehicle power system. With this arrangement, when the telephone is removed from the holster for portable usage, the battery attached to the telephone housing is fully charged, and the spare battery is also fully charged so that, during portable usage, the battery secured to the housing can be exchanged when depleted for the spare battery and, if desired, the depleted battery may then be placed in the pocket 38g so as to be charging while the spare battery is utilized to power the telephone.

Whereas preferred embodiments of the invention have been illustrated and described in detail, it will be apparent that various changes may be made in the disclosed embodiment without departing from the scope or spirit of the invention.

What is claimed is:

1. A rearview mirror mounted telephone system mounted in a vehicle, comprising:

a rearview mirror assembly comprising a housing having a reflective member associated with said housing in such a manner as to enable said reflective member to properly function as a rearview mirror; and two or more telephone related devices mounted to, within, or on said housing of said rearview mirror assembly, said devices selected from the group comprising: a microphone operable to receive audio messages for transmission through a telephone transceiver, means to initiate a telephone call, a telephone transceiver, a display to show telephone functions, and a speaker operable to play back audio messages received from a telephone transceiver.

2. The telephone system of claim 1, wherein said two or more telephone related devices is one of said microphone; and said display.

3. The telephone system of claim 2 where notification of an incoming message is delivered to a vehicle occupant through the vehicle speakers.

4. The telephone system of claim 3, where said notification is a ringing sound.

5. The telephone system of claim 2, where incoming voice signals are delivered to the vehicle occupant through the vehicle speakers.

6. The telephone system of claim 2 wherein said two or more telephone related devices is said display and wherein the telephone system further comprises a microphone placed on a location selected from the group comprising: said rearview mirror assembly, said housing, an instrument panel, a sun visor, a door glass, interior trim, clothing of vehicle occupant, a door mount, a roof mount, a pillar mount, and a rear package shelf mount.

7. The telephone system of claim 6, further comprising a speaker placed on a location selected from the group comprising: said rearview mirror assembly, said housing, an instrument panel, a sun visor, a door glass, interior trim, clothing of vehicle occupant, a door mount, a roof mount, a pillar mount, and a rear package shelf mount.

8. The telephone system of claim 2 further comprising a speaker placed on a location selected from the group comprising: said rearview mirror assembly, said housing, an instrument panel, a sun visor, at door glass, interior trim, clothing of vehicle occupant, a door mount, a roof mount, a pillar mount, and a rear package shelf mount.

9. The telephone system of claim 2, where said microphone is operable for readily picking up a vehicle occupant's voice for an outgoing message.

10. The telephone system of claim 2, further comprising one or more members of the group comprising: means to initiate a telephone call, means for providing voice recognition, an antenna, and a transceiver.

11. The telephone system of claim 1, wherein said two or more telephone related devices include said means to initiate a wireless communication and said display.

12. The telephone system of claim 11, where said display is mounted on said housing.

13. The telephone system of claim 11, where said means to initiate a wireless communication is mounted on said housing.

14. The telephone system of claim 13, where said display is mounted on said housing.

15. The telephone system of claim 13, where said means to initiate a wireless communication is completed through a transceiver placed in the vehicle.

16. The telephone system of claim 11, where said means to initiate a wireless communication is completed through a transceiver placed in a location selected from the group comprising: the vehicle, said rearview mirror assembly, said housing, the vehicle trunk, the engine compartment, and the passenger compartment.

17. The telephone system of claim 1, where said two or more telephone related devices include both said microphone and said display.

18. The telephone system of claim 17, where said microphone is associated with said housing and said display is associated with said reflective member.

19. The telephone system of claim 1, where said two or more telephone related devices includes said microphone.

20. The telephone system of claim 1, wherein the telephone system is mounted in a vehicle that is equipped with a mobile telecommunications transceiver.

21. The telephone system of claim 1, where said two or more telephone related devices includes said means to initiate a telephone call and a display, where said means to initiate a telephone call is completed through a transceiver placed in a location selected from the group comprising: the vehicle, said rearview mirror assembly, said housing, the vehicle trunk, the engine compartment, and the occupancy compartment.

22. The telephone system of claim 1, wherein the telephone system is a wireless telephone system and said two or more telephone related devices enable the wireless telephone system to provide hands-free operation of the wireless telephone system.

23. The telephone system of claim 22, where the hands-free operation is facilitated through use of voice recognition where the telephone system responds in a known manner to voice commands from a vehicle occupant.

24. The telephone system of claim 1, where said rearview mirror assembly has a wireless telephone system associated with said housing, and where said wireless telephone system is voice actuated.

25. The telephone system of 24, where the said actuated wireless telephone system provides hands-free operation through voice recognition.

26. The telephone system of 25, where the voice recognition allows said wireless telephone system to respond in a known manner to voice commands from a vehicle occupant.

27. The telephone system of claim 1, wherein the telephone system is mounted in a vehicle having an audio system including at least one speaker, where said rearview mirror assembly has a wireless telephone system associated therewith and where the volume of the audio system is automatically changed in response to one of incoming and outgoing calls.

28. The telephone system of claim 27, wherein the audio system is automatically muted in response to one of incoming and outgoing calls.

29. The telephone system of claim 27, where notification of an incoming message is delivered to a vehicle occupant through the at least one speaker.

30. The telephone system of claim 29, where the notification is a ringing sound.

31. The telephone system of claim 27, where incoming voice signals are delivered to the vehicle occupant through the at least one speaker.

32. The telephone system of claim 1, wherein the telephone system is adapted for use with a vehicle equipped with a mobile telecommunications transceiver, and said one or more telephone related devices includes said means to initiate a wireless communication, which is mounted to, within, or on said housing of said rearview mirror assembly.

33. The telephone system of claim 32, where said means to initiate a wireless communication is one or more buttons mounted on said housing.

34. The telephone system of claim 32, further comprising a microphone placed on a location selected from the group comprising: said rearview mirror assembly, said housing, an instrument panel, a sun visor, a door glass, interior trim, clothing of vehicle occupant, a door mount, a roof mount, a pillar mount, and a rear package shelf mount.

35. The telephone system of claim 32, further comprising a display.

36. The telephone system of claim 35, further comprising a microphone associated with said housing.

37. The telephone system of claim 35, where said display is associated with said reflective member.

38. The telephone system of claim 32, further comprising an antenna.

39. The telephone system of claim 20, wherein the transceiver is located in one of: the vehicle interior, said rearview mirror assembly, said housing, the vehicle trunk, the engine compartment, and the passenger compartment.

40. The telephone system of claim 32, wherein said means to initiate a wireless communication includes a pushbutton mounted on said rearview mirror assembly.

41. The telephone system of claim 32, wherein said means to initiate a wireless communication includes a voice-actuation circuit.

42. The telephone system of claim 32, wherein said means to initiate a wireless communication includes a microphone.

43. The telephone system of claim 1, wherein said two or more telephone related devices includes said display for displaying telephone related information to a vehicle occupant.

44. The telephone system of claim 43, wherein said display displays a telephone number.

45. The telephone system of claim 43, wherein said display displays the "roaming" status of the telephone system.

46. The telephone system of claim 43, wherein said display displays the "in use" status of the telephone system.

47. The telephone system of claim 43, wherein said display displays the "service area" status of the telephone system.

48. The telephone system of claim 43, wherein said display is coupled to a telephone transceiver that supplies the telephone related information that is displayed on said display.

49. The telephone system of claim 48, wherein said telephone transceiver is mounted to said rearview mirror assembly.

50. The telephone system of claim 48, wherein said telephone transceiver is mounted in the vehicle remotely from said rearview mirror assembly.

51. The telephone system of claim 1 and further comprising a mounting mechanism provided on said housing for releasably holding a portable telephone.

52. The telephone system of claim 51 and further including electrical contacts for providing power to the portable telephone when held by said mounting mechanism.

53. The telephone system of claim 51 and further including electrical contacts for coupling the portable telephone to at least one of an external antenna, a microphone, a transceiver, and a speaker.

54. The telephone system of claim 51, wherein said mounting mechanism includes a holster extending from said housing.

55. The telephone system of claim 51 and further including an indicator light on said housing, said light being illuminated when the portable telephone is fully mounted in said mounting mechanism.

56. The telephone system of claim 1 and further comprising at least one electrical contact disposed on or within said housing for providing power to charge a battery that is removable from said housing.

57. The telephone system of claim 56, wherein said at least one electrical contact is configured to provide power to charge a battery attached to a portable telephone.

58. The telephone system of claim 1 and further comprising a device disposed on or within said housing for enabling a communication link with a portable device that includes at least one of a microphone and a speaker.

59. The telephone system of claim 58, wherein the portable device is a headset including a microphone and a speaker.

60. The telephone system of claim 58, wherein the portable device is a microphone assembly.

61. The telephone system of claim 60, wherein said microphone assembly has a microphone housing and a mount for mounting said microphone housing to the vehicle.

62. The telephone system of claim 61, wherein said mount is a spring clip.

63. The telephone system of claim 58, wherein said portable device includes a speaker.

64. The telephone system of claim 58, wherein said device is a connector jack to which a cord from the portable device may be coupled.

65. The telephone system of claim 1 and further including a device disposed on or within said housing for connecting said circuitry to a remote audio accessory.

66. The telephone system of claim 65, wherein said remote audio accessory includes a speaker.

67. The telephone system of claim 65, wherein said remote audio accessory is the vehicle audio system.

68. The telephone system of claim 67, wherein said circuitry selectively mutes the vehicle audio system.

69. The telephone system of claim 68, wherein a telephone is associated with said rearview mirror assembly and coupled to said circuitry, said circuitry mutes the vehicle audio system when an incoming call is received by the telephone.

70. The telephone system of claim 68, wherein a telephone is associated with said rearview mirror assembly and coupled to said circuitry, said circuitry couples the audio system with the audio output of the telephone when an incoming call is received by the telephone.

71. The telephone system of claim 65, wherein said remote audio accessory includes a microphone.

* * * * *